Patented Sept. 27, 1932

1,879,997

UNITED STATES PATENT OFFICE

FRITZ STRAUB, OF BASEL, AND HERMANN SCHNEIDER, OF RIEHEN, NEAR BASEL, SWITZERLAND, ASSIGNORS TO FIRM SOCIETY OF CHEMICAL INDUSTRY IN BASLE, OF BASEL, SWITZERLAND

CHROMIUM COMPOUNDS OF ORTHO-HYDROXY-AZO-DYESTUFFS AND PROCESS OF MAKING SAME

No Drawing. Application filed June 7, 1928, Serial No. 283,731, and in Switzerland June 24, 1927.

The present invention relates to the manufacture of chromium compounds of ortho-hydroxy-azo-dyestuffs. It comprises the process of making these new compounds, as well as the new compounds themselves.

In the manufacture of chromium complexes from azo-dyestuffs containing groups capable of being chromed, particularly from ortho-hydroxy-azo-dyestuffs, by means of organic or inorganic chromium salts, it frequently happens that a part of the dyestuff is converted into chromium complexes which are useless, for they are sparingly soluble in water and cannot be converted, even by treatment with alkalies, into compounds capable of dyeing.

The present invention is based upon the discovery that this objection, which may give rise to serious losses, is in many cases obviated by adding to the mixture of the azo-dyestuff to be chromed with the agent yielding chromium, which agent hitherto almost always consisted, as is well-known, and as has already been stated, of chromium salts, i. e. organic chromium salts or inorganic chromium salts with agents capable of binding or neutralizing acids, organic salts in such a quantity that after the chroming process is complete the reaction mixture contains organic salts. In many cases it is advantageous to add to the chroming mass besides the mentioned additions also an inorganic salt. The chromation may further be carried out either in an open vessel or under pressure.

The following examples illustrate the invention, the parts being by weight:

Example 1

A paste of 22 parts of the azo-dyestuff from the nitrated diazo-compound of 1-amino-2-hydroxynaphthalene-4-sulfonic acid and β-naphthol of the formula

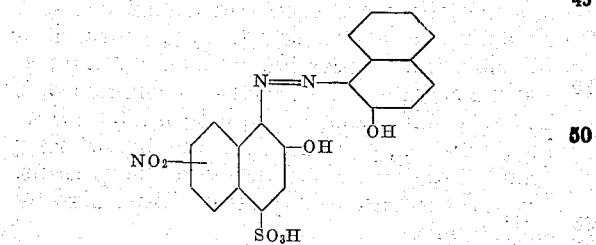

with about 18 parts of water, is finely suspended in a further 300 parts of water and there are added to the suspension 20 parts of crystallized sodium acetate and a solution of 10 parts of chromium formate, corresponding with 4.17 parts of $Cr_2O_3$, in 100 parts of water. The whole is boiled in a reflux apparatus until a dilute sample brought on filter paper shows no colour change when dabbed with sodium carbonate, the time required being about 6–8 hours.

The very easily soluble chromium compound is salted out while the liquid is hot and after cooling filtered, pressed and dried.

It dissolves in water extremely easily to a red-violet solution, in which wool is dyed red-brown in presence of formic acid or sulfuric acid. By prolonged boiling the dyeing becomes neutral black of good fastness to fulling.

In this example sodium formate or another salt may be substituted for the sodium acetate.

Example 2

79.9 parts of the dyestuff from diazotized 6-sulfo-4-chloro-ortho-aminophenol and β- naphthylamine (sodium salt) of the formula

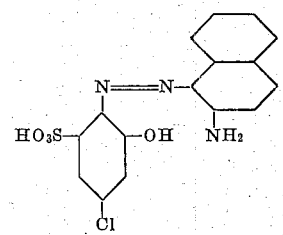

are dissolved in 1600 parts of water and 45.3 parts of crystallized sodium acetate are dissolved in the solution; 40 parts of chromium oxide, in the form of chromium formate, dissolved in 400 parts of boiling water are added and are followed by 16.2 parts of formic acid of 85 per cent. strength. The whole is boiled until the soluble chromium compound has been formed. The dyestuff is obtained in the usual manner.

*Example 3*

41.1 parts of the sodium salt of the dyestuff from diazotized 6-nitro-4-sulfo-2-amino-1-phenol and β-naphthol are dissolved in 800 parts of water while boiling. To this solution there are then added 15.2 parts of chromium oxide in the form of chromium fluoride, and further 408 parts of crystallized sodium acetate and 59.5 parts of common salt. The reaction mixture is boiled for a long time in a reflux apparatus, followed by filtering from chromium mud likely to be present. From the filtrate the dyestuff is separated by salting out.

What we claim is:—

1. As an improvement in the manufacture of chromium compounds of ortho-hydroxy-azo-dyestuffs, the conversion of the dyestuffs into chromium complexes by means of chromium salts in the presence of soluble salts of aliphatic monocarboxylic acids in such a quantity that afer the chroming process is complete the reaction mixture contains soluble salts of aliphatic monocarboxylic acids.

2. As an improvement in the manufacture of chromium compounds of ortho-hydroxy-azo-dyestuffs, the conversion of the dyestuffs into chromium complexes by means of chromium salts in the presence of sodium acetate in such a quantity that after the chroming process is complete the reaction mixture contains sodium acetate.

3. As new products of manufacture the chromium compounds of ortho-hydroxy-azo-dyestuffs obtained by conversion of the dyesuffs into chromium complexes by means of chromium salts in presence of sodium acetate in such a quantity that after the chroming process is complete the reaction mixture contains sodium acetate, which dyestuffs are more soluble than the products obtained without the addition claimed.

4. As new products of manufacture the chromium compounds of ortho-hydroxy-azo-dyestuffs obtained by conversion of the dyestuffs into chromium complexes by means of chromium salts in presence of soluble salts of aliphatic monocarboxylic acids in such a quantity that after the chroming process is complete the reaction mixture contains soluble salts of aliphatic monocarboxylic acids, which dyestuffs are more soluble than the products obtained without the addition claimed.

In witness whereof we have hereunto signed our names this 25th day of May, 1928.

FRITZ STRAUB.
HERMANN SCHNEIDER.